Oct. 11, 1932.　　G. W. HUNTINGTON　　1,882,016
MOWER FOR HIGHWAY SIDES
Filed May 22, 1931　　2 Sheets-Sheet 1
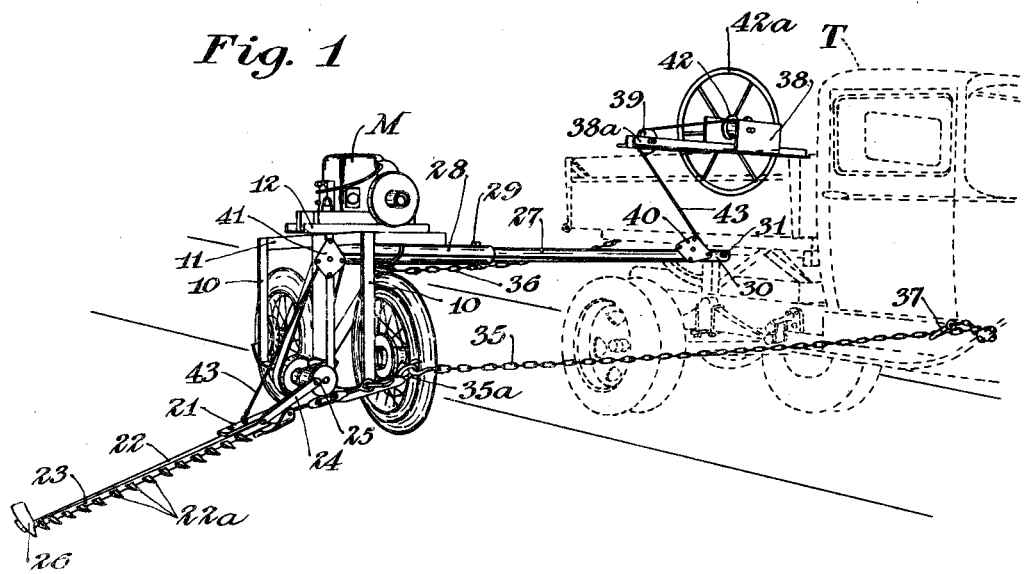
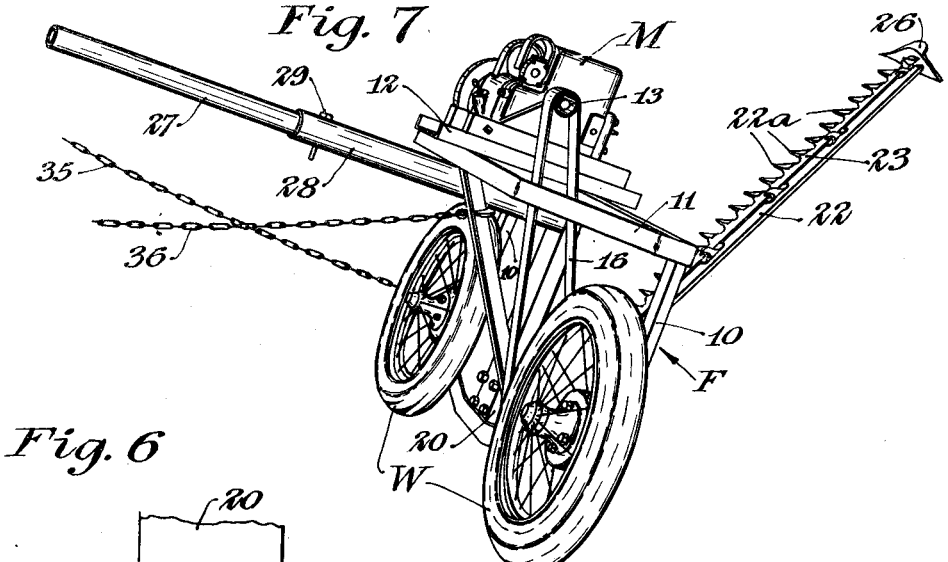
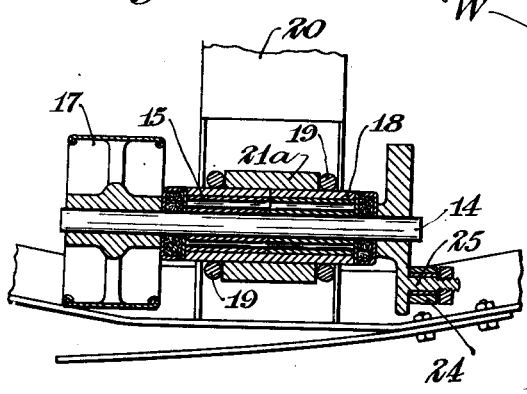
Inventor
George W. Huntington
By his Attorneys
Williamson & Williamson

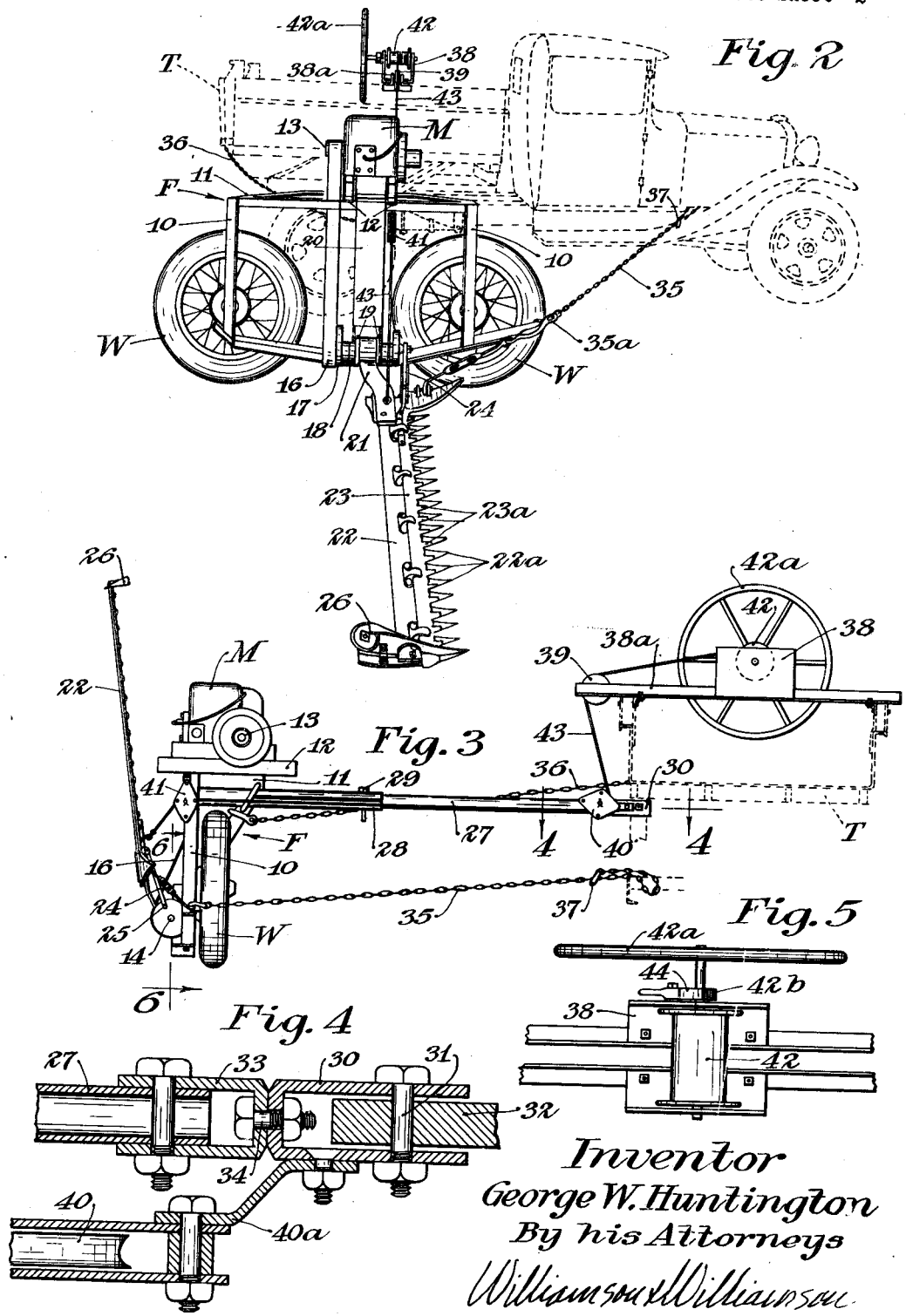

Patented Oct. 11, 1932

1,882,016

UNITED STATES PATENT OFFICE

GEORGE W. HUNTINGTON, OF GLENCOE, MINNESOTA

MOWER FOR HIGHWAY SIDES

Application filed May 22, 1931. Serial No. 539,298.

This invention relates to mowers for cutting the vegetation at the sides of a highway. At the present time it is a costly and laborious task to mow the shoulders, ditches and banks at the sides of a highway, as a large proportion of this work must be manually performed with scythes.

It is an object of this invention to provide a comparatively simple and highly efficient mower adapted to be associated with a truck or vehicle moving over the highway and adapted to cut the vegetation at the shoulders, ditches and banks at the sides of the road, It is a further object to provide a mower of the class described drawn or propelled by a vehicle traveling over the highway and having a wheel-supported mower bar adapted to be angularly adjusted from the associated truck or vehicle.

Another object is to provide in a mower of the class described a wheeled mower bar support which will travel over the sides of the highway and which is so constructed and associated with the truck or vehicle as to maintain the mower bar in operative cutting position substantially parallel with the ground regardless of irregularities or contours in the surface to be cut.

More specifically it is an object to provide in a mower of the class described a wheeled support mounted at one side of a vehicle which travels on the highway and carrying a motor for driving the mower head and connected with the draft vehicle with freedom for swinging movement on a horizontal axis relative thereto and with freedom for tilting movement on an axis which extends longitudinally of the connecting means or arm.

These and other objects and advantages of the invention will be more fully set forth in the following description made in connection with the accompanying drawings, in which like reference characters refer to similar parts throughout the several views, and in which:—

Fig. 1 is a perspective view of an embodiment of my invention applied in operative position for cutting the bank of a highway, a truck or draft vehicle being indicated in dotted lines;

Fig. 2 is a side elevation of the same;

Fig. 3 is a front elevation of the device showing the mower bar in the raised position for clearing an obstacle;

Fig. 4 is a longitudinal section showing the connection of the sweep or arm with a suitable bracket of the draft vehicle and taken on approximately the line 4—4 of Fig. 3;

Fig. 5 is a detail plan view showing the wheel controlled windlass for adjusting the angulation of the mower bar;

Fig. 6 is a section taken approximately on the line 6—6 of Fig. 3 showing the driving shaft and crank wrist for operating the sickle bar of the mower, and Fig. 7 is a perspective view showing the application of my improved mower for operating upon the outer bank of a ditch disposed at the side of the highway.

As illustrated in the drawings, my improved mower is associated with and drawn by means of a truck T or other vehicle which is designed to travel over a highway. The operating parts of the device are mounted upon a suitable upright frame indicated as an entirety by the letter F, which frame is supported from the ground, preferably by a pair of wheels W disposed in tandem relation and designed to travel in a path parallel with the path of the truck or draft vehicle. The wheels W may be provided with large pneumatic tires to minimize jolts and vibrations received through travel over irregular ground. The wheels are suitably journaled to upright members 10 of frame F. Frame F rigidly carries a skeleton top or support 11 to which is anchored the base 12 of a suitable motor M. Obviously a small internal combustion engine may be utilized for the motor or if desired a suitable electric motor may be provided. Motor M has a power take off shaft or pulley 13 which is connected for driving with a counter shaft or mower driving shaft 14 journaled in bearings such as the roller bearings 15 shown in Fig. 6. Bearings 15 are suitably mounted medially and adjacent the bottom of frame F and it will be noted that shaft 14 extends longitudinally of the frame on the outward side of wheels W. Any suitable driving connections may be made between power take off 13 and shaft 14, and as shown I provide an endless belt 16 which is trained about a wide pulley 17 fixed to the rear end of mower driving shaft 14.

The bearings 15 for the mower driving shaft as shown are housed within a heavy sleeve 18 which is rigidly secured by U-bolts 19 to a central vertical member 20 of the rigid frame F. A mower bar supporting bracket 21 is swingably mounted upon the medial portion of sleeve 18, said bracket having a heavy collar 21a which surrounds the said sleeve. The mower bar or arm 22 is rigidly affixed at one end to the outer end of bracket 21 and carries the usual guards 22a between which the blades 23a of the sickle bar 23 reciprocate. The inner end of sickle bar 23 is connected for driving by means of a pitman 24 with a crank wrist 25, said crank being fixed to the forward end of mower driving shaft 14. The outer end of the mower arm 22 may be provided with the usual ground-engaging supporting shoe 26 or if desired, a small wheel may be provided.

The wheeled frame F is adjustably connected with the truck T or draft vehicle and is held in substantially upright position by means of a substantially horizontal arm 27, the outer end of said arm telescoping in and being rigidly and adjustably connected with a sleeve 28 which as shown is rigidly connected to frame F below the top or upper support 11 and which sleeve projects substantially horizontally and inwardly from the frame. The adjustable connection between the said telescoping parts 27 and 28 may be made by any suitable means and as shown I provide a diametrically extending pin or bolt 29 adapted to pass through adjustment apertures in the telescoping parts. It will therefore be apparent that the frame F may be connected with the draft vehicle and disposed at various distances from the connected side thereof.

Arm 27 is connected at its inner end with the truck or draft vehicle in such a manner as to permit up and down swinging movement of the arm on a horizontal axis and also oscillation on an axis extending longitudinally of the arm. Any suitable means may be provided for obtaining these results and as clearly shown in Fig. 4, I provide a U-bracket 30 pivoted by means of a bolt 31 to a heavy attachment lug 32 secured to the truck and extending laterally thereof, said connection supplying freedom for up and down swinging movement of the arm. The inner end of arm 27 is swivelly connected with the medial portion of U-bracket 30 by means of a bracket or sleeve 33 swivelly connected at its inner end with the end or medial portion of U-bracket 30 by means of the swivel bolt 34, this connection enabling the arm 27 to be oscillated on its longitudinal axis relative to the U-bracket 30 and attachment lug 32 of the truck.

Chains 35 and 36 adjustably connect the frame F with points on the adjacent side of the truck or draft vehicle located well ahead of the connection of the arm 27 and behind said connection respectively for the purpose of bracing the arm 27 and for further supplying suitable draft connections for overcoming side draft upon the wheeled frame. The chain 35 as shown is connected by a grab hook with an eye 35a secured to the forward end and lower portion of frame F and the opposite end of said chain is adjustably connected with a suitable chain fastening device 37 secured to the truck as shown just forward of the door to the cab. The outer end of chain 36 as shown is connected with the medial portion of frame F and its inner end is adjustably connected with a suitable chain fastener mounted at the rear of truck F.

The mower arm or bar is angularly adjustable from the truck or draft vehicle by suitable means such as a windlass mounted as shown upon a bracket 38 which may traverse the body or hopper of the truck and which has a laterally projecting end 38a on which a guide sheave 39 is mounted. A second guide sheave 40 is journaled in a suitable bracket 40a attached to the U-bracket 30 to which the arm 27 is connected. A third sheave 41 is mounted on the central vertical frame member 20 and a winding drum 42 having attached thereto a hand wheel 42a is trunnioned in windlass supporting bracket 38 and substantially aligned with the first sheave 39. A flexible element such as a cable 43 is secured to drum 42 and passes over sheave 39, under sheave 40, over sheave 41 and has its outer end connected to the outer portion of the mower bar supporting bracket 21. As shown in Fig. 5, the shaft of the windlass drum 42 carries a ratchet 42b which is engaged by a gravity actuated pawl 44 to retain the drum in any desired position. It will be apparent that by means of the windlass the mower bar 22 may be raised or lowered and swung upon the axis of the sleeve 18.

Operation

The connections between the truck or draft vehicle and the wheeled supporting frame F are first adjusted to position the supporting frame F properly for causing the mower mechanism to operate upon the desired portion of the side of a highway. This adjustment is made by securing telescoping arm 27 with sleeve 28 at the desired point and then tightening draft chain 35 and rear chain 36. It will of course be apparent that for cutting banks or ditches disposed some distance from the edge of the highway a longer arm 27 may be substituted for the arm or sweep illustrated. As shown in Figs. 1 and 2 of the drawings, my machine is adjusted for cutting the bank adjacent one side of a highway, while in Fig. 7 a portion of the machine is shown in extended position adjusted for cutting the outer bank of a ditch disposed some distance from the highway. It will be apparent that various adjustments may be made both as to the distance the wheeled supporting frame is positioned from the truck or draft vehicle and with reference to the angulation of the mower bar 22.

The motor M is started reciprocating the sickle bar through its driving connections therewith. The draft vehicle then travels over the highway and an attendant located adjacent the windlass 42 watches the angulation of the mower bar and properly adjusts the same by manipulation of the wheel 42a. If an obstacle, such as a post or large rock appears ahead of the mower bar the attendant may quickly wind the windlass swinging the mower bar to the upright position illustrated in Fig. 3. It will be noticed that the supporting frame F may oscillate upon an axis disposed longitudinally of connecting arm 27 in order to permit the wheels to properly engage rises in the ground and the frame and arm may swing in a vertical plane on the horizontal axis of the pivot 31 shown in Fig. 4. Provision is thus made for the frame to properly conform to the contour of the ground over which it travels, holding the mower bar at all times substantially parallel with the surface on which the vegetation to be cut is growing.

In using the device a swath is usually cut parallel with the highway for some distance and the machine is then adjusted to cut a swath adjacent thereto. It will be seen that with my device the banks, ditches and shoulders of the road may be operated on by properly adjusting the supporting frame with reference to the draft vehicle and by angularly adjusting the mower bar in the proper position. In cutting ditches it is sometimes necessary to provide additional mower bars of shorter length which may be substituted for the bar 22 shown in the drawings, said bar being detachably connected with the supporting bracket 21.

The device is ruggedly made to withstand hard usage, comprises comparatively few parts and may be manufactured at a relatively low cost.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. In combination with a vehicle adapted to travel over a highway, a mowing machine comprising a supporting frame connected with said vehicle and drawn thereby in a path extending parallel to the travel of said vehicle, means for holding said frame in widely spaced relation to one of the sides of said vehicle, said frame having ground engaging supporting means, a mower device mounted on said frame and angularly adjustable relatively thereto and a motor mounted on said frame for driving said mower device.

2. The structure set forth in claim 1, and means controllable from said vehicle for adjusting the angulation of said mower device relatively to said frame.

3. In combination with a vehicle adapted to travel over a highway, a mowing machine comprising a frame having ground engaging supporting means, a rigid arm interposed between said frame and said vehicle for holding said frame in substantially upright position parallel with said vehicle, a connection between the inner end of said arm and said vehicle permissive of swinging movement of said arm on a substantially horizontal axis, a mower device mounted on said frame and angularly adjustable relatively thereto, and means for driving said mower device.

4. The structure set forth in claim 3, and said arm being also mounted for oscillation on a longitudinal axis.

5. In combination with a vehicle adapted to travel over a highway, a mowing machine comprising a frame having a pair of ground-engaging wheels arranged in tandem, an arm connecting said frame with said vehicle and holding said frame in substantially upright position substantially parallel to said vehicle, said arm having connections associated therewith to permit oscillation of said arm on a longitudinal axis and to also permit swinging movement of said arm on an axis extending longitudinally of said vehicle, a mower device mounted on said frame and projecting laterally therefrom, means associated with said frame for driving said mower device and means for controlling the angulation of said mower device relatively to said frame.

6. The structure set forth in claim 5, wherein said driving means comprises a motor mounted on said frame.

7. The structure set forth in claim 5 wherein said angulation adjusting means for said mower device comprises a windlass mounted on said vehicle.

8. In combination with a draft vehicle, a mowing device comprising a frame supported upon a pair of ground-engaging wheels which are arranged in tandem, means connecting said frame and vehicle in widely spaced relation with said ground-engaging wheels disposed substantially parallel to one of the sides of said vehicle, said means being permissive of oscillation of said frame on an axis extending transversely of said frame, said means also permitting up and down swinging movement of said frame relative to said vehicle; and mower mechanism carried by said frame.

9. In combination with a draft vehicle, a mowing machine comprising an arm or sweep connected with said vehicle adjacent its inner end for swinging movement on a substantially horizontal axis extending longitudinally of said vehicle, said arm extending laterally with reference to one of the sides of said vehicle and carrying a frame at the outer end thereof, a pair of ground-engaging members arranged in tandem for supporting said frame and the outer end of said arm, said frame and arm being constructed to permit tilting or oscillation of said frame on a transverse axis and mower mechanism carried by said frame and extending transversely thereof.

10. In combination with a draft vehicle, a mowing machine comprising, a rigid arm or sweep connected with said vehicle adjacent its inner end for swinging movement on a substantially horizontal axis extending longitudinally of said vehicle, said arm or sweep extending laterally with reference to one of the sides of said vehicle and carrying a substantially upright frame at the outer end thereof, a pair of ground-engaging wheels mounted on said frame and arranged in tandem, said frame and arm being constructed to permit tilting or oscillation of said frame on a transverse axis and mower mechanism carried by said frame and projecting outwardly and laterally therefrom.

11. In combination with a vehicle, a mowing machine for highways comprising an arm connected with said vehicle adjacent its inner end and extending laterally from one of the longitudinal sides of said vehicle, ground engaging means for supporting the outer end of said arm, mower mechanism mounted at the outer end of said arm and a motor also mounted at the outer end of said arm for driving said mower mechanism.

12. In combination with a vehicle, a mowing machine for highways comprising an arm connected with said vehicle adjacent its inner end and extending outwardly from one of the longitudinal sides of said vehicle, draft connections between the outer end of said arm and said vehicle, ground engaging means for supporting the outer end of said arm, mower mechanism mounted at the outer end of said arm, a motor also mounted at the outer end of said arm for driving said mower mechanism and means controllable from said vehicle for adjusting the angulation of said mower mechanism.

13. The structure set forth in claim 12, wherein said arm is longitudinally adjustable and wherein said draft connections are also adjustable.

14. In combination with a draft vehicle, a mowing machine comprising a frame disposed in spaced relation to one of the sides of said vehicle and having ground engaging supporting means, connections between said frame and said vehicle for holding said frame in spaced relation to said vehicle and for permitting said frame to swing up and down with reference to said vehicle, a flexible draft connection between said frame and said vehicle, mower mechanism mounted adjacent the lower portion of said frame and including a cutter bar projecting outwardly from said frame and means on said frame for driving said mower mechanism.

15. The structure set forth in claim 14 and a ground engaging shoe for supporting the inner end of said cutter bar and means controllable from said vehicle for adjusting the angulation of said cutter bar.

16. In combination with a draft vehicle, a mowing machine comprising a frame disposed in spaced relation to one of the sides of said vehicle and having ground engaging supporting means, connections between said frame and said vehicle for holding said frame in spaced relation to said vehicle and for permitting said frame to swing up and down with reference to said vehicle, mower mechanism mounted adjacent the lower portion of said frame including a driving shaft and a cutter bar projecting outwardly from said frame, said cutter bar being swingably mounted on an axis concentric with the axis of said driving shaft, means controllable from said vehicle for adjusting the angulation of said cutter bar and a motor mounted on said frame and connected for driving said shaft.

In testimony whereof I affix my signature.

GEORGE W. HUNTINGTON.